(12) United States Patent
Berbee et al.

(10) Patent No.: US 11,136,419 B2
(45) Date of Patent: Oct. 5, 2021

(54) ETHYLENE-BASED POLYMERS WITH NEW DISTRIBUTIONS OF TERMINAL AND INTERNAL UNSATURATIONS

(71) Applicant: Dow Global Technologies LLC, Midland, MI (US)

(72) Inventors: Otto J. Berbee, Hulst (NL); Stefan Hinrichs, Terneuzen (NL); Bharat I. Chaudhary, Collegeville, PA (US); Teresa P. Karjala, Lake Jackson, TX (US); John O. Osby, Lake Jackson, TX (US); Jose Ortega, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/634,914

(22) PCT Filed: Jul. 13, 2018

(86) PCT No.: PCT/US2018/042141
§ 371 (c)(1),
(2) Date: Jan. 29, 2020

(87) PCT Pub. No.: WO2019/027659
PCT Pub. Date: Feb. 7, 2019

(65) Prior Publication Data
US 2020/0231712 A1 Jul. 23, 2020

Related U.S. Application Data

(60) Provisional application No. 62/539,093, filed on Jul. 31, 2017.

(51) Int. Cl.
*C08F 2/01* (2006.01)
*C08F 10/02* (2006.01)
(Continued)

(52) U.S. Cl.
CPC .......... *C08F 2/01* (2013.01); *C08F 2/00* (2013.01); *C08F 2/38* (2013.01); *C08F 10/02* (2013.01); *C08F 210/02* (2013.01)

(58) Field of Classification Search
CPC .......... C08F 2/01; C08F 10/02; C08F 210/02; C08F 2/00; C08F 2/001; C08F 2/38; (Continued)

(56) References Cited

U.S. PATENT DOCUMENTS 4,014,859 A 3/1977 Cooper et al.
4,018,852 A 4/1977 Schober
(Continued)

FOREIGN PATENT DOCUMENTS

DE 276598 A3 3/1990
EP 3 168 237 A1 * 5/2017
(Continued)

OTHER PUBLICATIONS

Boghetich et al., "Free-radical copolymerization of a-olefins with ethylene", Journal of Polymer Science, 1962, vol. 61, p. 3-8.
(Continued)

*Primary Examiner* — William K Cheung
(74) *Attorney, Agent, or Firm* — Dinsmore & Shohl LLP

(57) ABSTRACT

A high pressure, free radical polymerization process to form an ethylene-based polymer, the process comprising at least the following step: polymerizing a reaction mixture comprising ethylene, using a polymerization system comprising the following: (A) a reactor configuration comprising at least one reactor that comprises at least two reaction zones, a first reaction zone (reaction zone 1) and an ith reaction zone (where i≥2); wherein the ith reaction zone is the last reaction zone, and wherein i is the total number of reaction zones; (B) at least two ethylene-based feed streams, a first ethylene-based feed stream and an nth ethylene-based feed stream,
(Continued)

wherein the first ethylene-based feed stream is sent to the first reaction zone, and the nth ethylene-based feed stream is the last ethylene based feed stream sent to the reactor configuration; wherein n≤i; and RZn/RZ1 does not equal 1.0, where RZ1=mole fraction of make-up ethylene in the first ethylene-based feed stream to the first reaction zone; where RZn=mole fraction of make-up ethylene in the last ethylene-based feed stream sent to the reactor configuration; (C) a control system to control the percentage of the make-up ethylene in the first ethylene-based feed stream, and the percentage of the make-up ethylene in the nth ethylene-based feed stream; and wherein at least one reaction zone receives a CTA make-up feed stream comprising an alpha-olefin, and wherein the alpha-olefin has a chain transfer activity constant (Cs) value ≤0.10, and wherein the chain transfer activity constant (Cs) is measured at 1360 atm, 130° C.

9 Claims, 3 Drawing Sheets

(51) Int. Cl.
  *C08F 210/02*  (2006.01)
  *C08F 2/38*  (2006.01)
  *C08F 2/00*  (2006.01)

(58) Field of Classification Search
  CPC .. C08F 2810/20; C08F 210/08; C08F 230/08; C08F 2500/09; C08F 2500/10; Y02P 20/582
  USPC .......................................................... 526/72
  See application file for complete search history.

(56) References Cited

U.S. PATENT DOCUMENTS

| | | |
|---|---|---|
| 5,346,961 A | 9/1994 | Shaw et al. |
| 5,539,075 A | 7/1996 | Gustafsson et al. |
| 9,120,880 B2 | 9/2015 | Zschoch et al. |
| 9,228,036 B2 | 1/2016 | Berbee et al. |
| 9,334,348 B2 | 5/2016 | Berbee et al. |
| 9,394,389 B2 | 7/2016 | Berbee et al. |
| 9,751,964 B2 | 9/2017 | Eddy et al. |
| 2003/0114607 A1 | 6/2003 | Donck |

FOREIGN PATENT DOCUMENTS

| | | |
|---|---|---|
| EP | 3168237 A1 | 5/2017 |
| WO | 0168723 A2 | 9/2001 |
| WO | 0214379 A1 | 2/2002 |
| WO | 2013059042 A1 | 4/2013 |
| WO | 2013078018 A2 | 5/2013 |
| WO | 2016204949 A1 | 12/2016 |
| WO | 2016210308 A1 | 12/2016 |

OTHER PUBLICATIONS

Ehrlich et al., "Fundamentals of the free radical polymerization of ethylene", Adv. Polymer Sci., 1970, vol. 7, 386-448.

Mortimer, G., "Chain transfer in ethylene polymerization", Journal of Polymer Science: Part A-1, 1966, vol. 4, p. 881-900.

Mortimer, G., "Chain transfer in ethylene polymerization VII. Very reactive and depleteable transfer agents", Journal of Polymer Science: Part A-1, 1972, vol. 10, p. 163-168.

Mortimer, G., "Chain transfer in ethylene polymerization. Part IV. Additional study at 1360 atm and 130C", Journal of Polymer Science: Part A-1, 1970, vol. 8, p. 1513-1523.

Mortimer, G., "Chain transfer in ethylene polymerization. Part V. The effect of temperature", Journal of Polymer Science: Part A-1, 1970, vol. 8, p. 1535-1542.

Goto et al., "Computer model for commercial high pressure polyethylene reactor based on elementary reaction rates obtained experimentally", Journal of Applied Polymer Science: Applied Polymer Symposium, 1981, 36, pp. 21-40.

Yamamoto et al., "Rate constant for long chain-chain branch formation in free-radical polymerization of ethylene", J. Macromol. Science-Chem., 1979, A13 (8), pp. 1067-1080.

Reid et al., "Molecular Rheology and Statistics of Long Chain Branched Metallocene-Catalyzed Polyolefins", Macromolecules, 2001, 34, 1928-1945.

Smedberg et al., "Characterization of an unsaturated low-density polyethylene", J. Polym. Sci. A Polym. Chem., 2003, 41, pp. 2974-2984.

International Search Report and Written Opinion pertaining to PCT/US2018/042141, dated Oct. 17, 2018.

* cited by examiner

— Chain segments formed in the 1st reaction zone
--- Chain segments formed in the 2nd reaction zone
— Chain segments formed in the 3rd reaction zone
— — Chain segments formed in the 4th reaction zone
······ Inner polymer sphere boundary
----- Outer polymer sphere boundary

ETHYLENE-BASED POLYMERS WITH NEW DISTRIBUTIONS OF TERMINAL AND INTERNAL UNSATURATIONS

REFERENCE TO RELATED APPLICATIONS

The present application is a National Stage Entry under 35 U.S.C. § 371 of International Patent Application No. PCT/US2018/042141, filed Jul. 13, 2018, which claims the benefit of U.S. Provisional Application 62/539,093, filed on Jul. 31, 2017.

BACKGROUND OF THE INVENTION

Due to the long chain branching mechanism in a high pressure polymerization, initially formed polymer molecules can be reinitiated, by which polymer molecules can consist of polymer chain segments made in different reaction zones and/or at different reaction conditions within a tubular reactor zone. Large polymer molecules can have numbers of carbon atoms varying from 10,000 to in excess of 100,000. These large polymer molecules consist of a backbone and chain segments (long chain branches) with different priorities and seniorities. The concept of priority and seniority is explained in the following reference from Reid, McLeish, *Macromolecules* 2001, 34, 1928-1945.

For crosslinking, the unsaturation levels in the chain segments with the lower priorities and seniorities (carbon segments formed in later stages of the polymerization) are of importance, due to their accessibility by radicals from the crosslinking peroxide to form a polymer chain segment radical and the accessibility of the polymer chain segment to form a crosslink through termination by combination with another polymer chain segment radical.

There is a need for the production of ethylene-based polymers with diversified and/or controlled distributions of the unsaturation groups in the polymer, and with improved MWD and melt strength behavior. These needs have been met by the following invention.

SUMMARY OF INVENTION

A high pressure, free radical polymerization process to form an ethylene-based polymer, the process comprising at least the following step:

polymerizing a reaction mixture comprising ethylene, using a polymerization system comprising the following:

(A) a reactor configuration comprising at least one reactor that comprises at least two reaction zones, a first reaction zone (reaction zone 1) and an ith reaction zone (where i≥2); wherein the ith reaction zone is the last reaction zone, and wherein i is the total number of reaction zones;

(B) at least two ethylene-based feed streams, a first ethylene-based feed stream and an nth ethylene-based feed stream, wherein the first ethylene-based feed stream is sent to the first reaction zone, and the nth ethylene-based feed stream is the last ethylene based feed stream sent to the reactor configuration; wherein n≤i; and RZn/RZ1 does not equal 1.0, where RZ1=mole fraction of make-up ethylene in the first ethylene-based feed stream to the first reaction zone;

where RZn=mole fraction of make-up ethylene in the last ethylene-based feed stream sent to the reactor configuration;

(C) a control system to control the percentage of the make-up ethylene in the first ethylene-based feed stream, and the percentage of the make-up ethylene in the nth ethylene-based feed stream; and wherein at least one reaction zone receives a CTA make-up feed stream comprising an alpha-olefin, and wherein the alpha-olefin has a chain transfer activity constant (Cs) value ≤0.10, and wherein the chain transfer activity constant (Cs) is measured at 1360 atm, 130° C.

DETAILED DESCRIPTION

Figure 1:
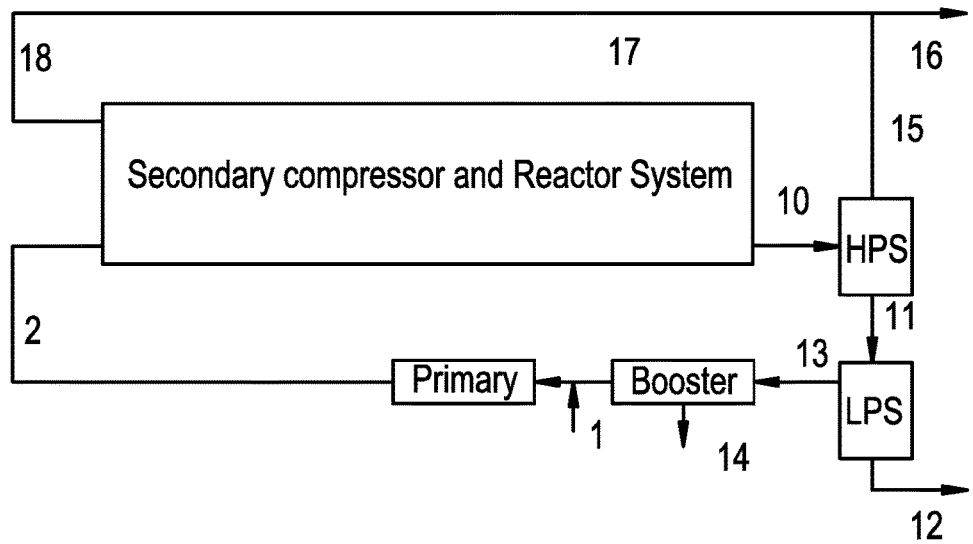
FIG. 1 depicts a generalized flow scheme for a high pressure polymerization process.

A high pressure, free radical polymerization process to form an ethylene-based polymer as discussed above in the Summary of Invention. An inventive process may comprise a combination of two or more embodiments as described herein.

Ethylene-based polymers with diversified and/or controlled distributions of the unsaturation groups in the polymer can be produced, leading to more efficient peroxide crosslinking, higher line speed and/or improved sag resistance, and improved MWD (molecular weight distribution) and melt strength behavior. Such polymers are suitable in wire cable applications. Such polymers can be prepared in tubular and/or autoclave reactor systems. Also, alpha-olefins may be distributed in the polymer, leading to improved processing and improved product properties, such as improved crosslinking in wire cable applications.

In one embodiment, n is selected from 2, 3, 4, 5 or 6.

In one embodiment, the Cs value is ≤0.05, or ≤0.04, or ≤0.03, or ≤0.02, at 1360 atm, 130° C.

In one embodiment, the polymerization system further comprises a hyper-compressor system. In a further embodiment, the control system is located at the inlet section of the hyper-compressor system.

In one embodiment, the control system is a three-port valve. In one embodiment, the control system is a two-port valve.

In one embodiment, the maximum temperatures in the first reaction zone and, optionally, the $2^{nd}$ reaction zone are each ≤270° C., or ≤260° C., or ≤250° C., or ≤240° C., or ≤230° C. In one embodiment, the minimum temperatures in the first reaction zone and, optionally, the $2^{nd}$ reaction zone are each ≥130° C., or ≥140° C., or ≥150° C., or ≥160° C.

In one embodiment, the first reaction zone receives a lower molar concentration (moles of alpha-olefin divided by total moles of components in the ethylene-based feed stream to the first reaction zone) of an "CTA system comprising an alpha-olefin" in the ethylene-based feed stream to the first reaction zone, as compared the molar concentration of the "CTA system comprising the alpha-olefin" in at least one ethylene-based feed stream to a subsequent reaction zone.

In one embodiment, the molar concentration of an "alpha-olefin CTA" in the ethylene-based feed stream to the first reaction zone is less than the molar concentration of the same "alpha-olefin CTA" in the cumulative feed (the as sum of the first, second, etc. ethylene-based feed streams) to one or more reaction zones.

In one embodiment, the reactor configuration comprises only tubular reactors or autoclave/tubular reactor combinations.

In one embodiment, the reactor system further comprises a recycle line from a high pressure separator and/or a recycle line from a low pressure separator. In a further embodiment, ≥50, or ≥60, or ≥70, or ≥80 molar percent of CTAs fed to the reactor configuration derives from the recycle line from a high pressure separator and/or from the recycle line from a low pressure separator.

Also is provided an ethylene-based polymer formed by a process of one or more embodiments described herein. In one embodiment, the ethylene-based polymer is LDPE.

In one embodiment, the ethylene-based polymer has a ratio of the total vinyl (V1") of the polymer at the peak temperature in the last reaction zone versus the total vinyl (V1) in the final polymer ≥1.55, or ≥1.60, or ≥1.65.

In one embodiment, the ethylene-based polymer has a ratio of the total vinyl (V1") of the polymer at the peak temperature in the last reaction zone versus the total vinyl (V1) in the final polymer ≤1.40, or ≤1.35, or ≤1.30.

In one embodiment, the ethylene-based polymer has a ratio of the total vinyl (V1") in the hexane extractables of the final polymer versus the total vinyl (V1) in the final polymer ≥1.55, or ≥1.60, or ≥1.65.

In one embodiment, the ethylene-based polymer has a ratio of the total vinyl (V1") the hexane extractables of the final polymer versus the total vinyl (V1) in the final polymer ≤1.40, or ≤1.35, or ≤1.30.

In one embodiment, the ethylene-based polymer has a total vinyl content (V1) from 0.460 to 0.520 per 1000 carbons (total carbons), and a V1/V2 ratio from 1.60 to 1.99, where V2 is the vinylidene content derived from β (beta)-elimination of tertiary radical or from the β (beta)-scission of a tertiary radical. In a further embodiment, V2 is the vinylidene content derived from the β-scission of a tertiary radical.

Also is provided, a composition comprising the ethylene-based polymer. Also is provided an article comprising at least one component formed from the composition.

In one embodiment, the article is cable insulation. In one aspect the invention relates to a process for making cable insulation using a high melt strength ethylene-based polymer made in a tubular reactor with an improved distribution of vinyl functional groups inter and intra polymer molecules. In another aspect, the invention relates to a process for making cable insulation using a high melt strength ethylene-based polymer made in a tubular reactor and having a broader MWD.

Process

For producing a highly branched ethylene-based polymer, a high pressure, free-radical initiated polymerization process is typically used. Two different high pressure free-radical initiated polymerization reactor types are known. In the first type, an agitated autoclave vessel having one or more reaction zones is used. The autoclave reactor normally has several injection points for initiator and/or monomer feeds. In the second type, a jacketed tube having one or more reaction zones is used as a reactor with cooling and/or heating zones. Suitable, but not limiting, reactor lengths may be from 100 to 3600 meters (m), or from 1000 to 2800 m. The beginning of a reaction zone, for either type of reactor, is typically defined by the injection and/or activation of a free radical source, and the side injection of, ethylene, CTA (or telomer), comonomer(s), and any combination thereof. A high pressure process can be carried out in autoclave or tubular reactors having one or more reaction zones, or in a combination of autoclave and tubular reactors, each comprising one or more reaction zones.

In one embodiment, the inventive process takes place in a reactor configuration comprising a tubular reactor. In an embodiment, the inventive process takes place in a reactor configuration comprising at least one autoclave and/or tubular reactor. In one embodiment, the inventive process takes place in a reactor configuration comprising a tubular reactor and an autoclave reactor. In one embodiment, the tubular reactor is downstream from the autoclave reactor.

In one embodiment, the control system comprises at least one valve. In one embodiment, each valve is a two-way valve. In one embodiment, each valve is a three-way valve. In one embodiment, each valve is a multiple-way valve with at least one inlet and at least two outlets, or at least two inlets and at least two outlets. In one embodiment, the control system comprises at least two valves. In one embodiment, each valve is a two-way valve. In one embodiment, each valve is a three-way valve. In one embodiment, each valve is a multiple-way valve with at least one inlet and at least two outlets, or at least two inlets and at least two outlets.

In one embodiment, the control system includes at least one analyzer. In one embodiment, each valve of the control system is connected to at least one analyzer through a feedback loop. In one embodiment, each line that feeds an ethylene feed stream to a reaction zone includes a valve to control the amount of the feed stream that enters the reaction zone. In one embodiment, one or more lines feeding an ethylene feed stream to a reaction zone includes a valve to control the distribution of the ethylene feed streams over the zones.

In one embodiment, the make-up ethylene does not contain a chain transfer agent other than one or more residual compounds originating from an ethylene production process or an ethylene fractionation process.

Often a CTA is used to control molecular weight. In one embodiment, one or more CTAs are added to an inventive polymerization process. CTAs typically comprise at least one of the following groups: unsaturated hydrocarbons, alkanes, aldehydes, ketones, alcohol, ether, esters, mercaptan or phosphine. I. Exemplary CTAs include, olefinic CTAs, such as, but are not limited to, propylene, isobutene, 1-butene, pentene-1, hexene-1, heptene-1, octene-1, butene-2, 2 methyl butene-1, 2 methyl butene-2 and 4 methyl pentene-1. In one embodiment, the amount of CTA used is from 0.03 to 10 weight percent based on the weight of the total reaction mixture.

In one embodiment, the process includes a high pressure and low pressure recycle loop to improve ethylene efficiency, since ethylene is only partially converted or consumed per reactor pass. Typically, the conversion level per reactor pass is from 12% to 40%, with the conversion levels for tubular reactors at the higher end of this range, and the conversion levels for autoclave reactors at the lower end of this range.

In one embodiment, the polymerization may take place in a tubular reactor as described in International Appl. No. PCT/US12/059469, filed Oct. 10, 2012 (now WO2013/059042). This patent application uses a multi-zone reactor, and describes alternate locations of feeding fresh ethylene to control the ethylene to CTA ratio, and therefore polymer properties. Fresh ethylene may be simultaneously added in multiple locations, to achieve the desired ethylene to CTA ratio. In a similar way, addition of fresh CTA at addition points may be carefully selected to control polymer properties, as described in International Application No. PCT/US12/064284, filed Nov. 9, 2012 (now WO2013/078018). Fresh CTA may be simultaneously added in multiple locations, to achieve the desired CTA to ethylene ratio.

Likewise, the addition points and the amount of the fresh rheology modifying agent (branching agent), as described in this application, may be controlled, to control gel formation, while maximizing the melt strength and performance in targeted applications. In one embodiment, fresh rheology modifying agent may be simultaneously added in multiple locations, to achieve the desired rheology modifying agent to ethylene ratio. The use of a rheology modifying agent to broaden MWD, and to increase the melt strength of the polymer, will put further requirements on the distribution of the CTA and the rheology modifying agent along a reactor system, in order to achieve the desired change in product properties, without, or by minimizing, potential negative impacts like, for example, gel formation, reactor fouling, process instabilities, and/or low efficiency of the rheology modifying agent.

In one embodiment, the polymerization takes place in at least one tubular reactor. In a multi-reactor system, the autoclave reactor usually precedes the tubular reactor. The addition points and amounts of fresh ethylene, fresh CTA, and fresh rheology modifying agent, may be appropriately controlled, to achieve the desired ratios of CTA to ethylene, and rheology modifying agent to ethylene, in the feeds to, and/or in, the reaction zones.

In one embodiment, the polymerization takes place in two reactors. In one embodiment, the polymerization takes place in one reactor with multiple or ≥two reaction zones.

In one embodiment, the polymerization takes place in a reactor configuration comprising at least two reaction zones, reaction zone 1 and reaction zone i (i≥2), and wherein reaction zone i is downstream from reaction zone 1. In an embodiment, i is from 2 to 6, or from 2 to 5, or from 2 to 4. In an embodiment, i=2 or i=3. In one embodiment, the total number of reaction zones=i. In a further embodiment, i is from 2 to 20, further from 2 to 10, and further from 1 to 6.

In one embodiment, the ethylene-based polymer comprises ethylene, and, optionally, one or more other comonomers, and preferably one comonomer. Comonomers include, but are not limited to, α-olefins, vinylacetate, acrylates, methacrylates and anhydrides, each typically having no more than 20 carbon atoms. The α-olefin comonomers, which have a combined monomer and CTA functionality, may have 3 to 10 carbon atoms, or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4 methyl-1-pentene and combinations thereof.

A free radical initiator, as used herein, refers to a free radical generated by chemical and/or radiation means. Exemplary free radical initiators include organic peroxides including, but not limited to, cyclic peroxides, diacyl peroxides, dialkyl peroxides, hydro-peroxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. In one embodiment, these organic peroxide initiators are used in an amount from 0.001-0.2 wt %, based upon the weight of polymerizable monomers. In one embodiment, an initiator is added to at least one reaction zone and the initiator has a half-life temperature at one second greater than 255° C., preferably greater than 260° C. In a further embodiment, such initiators are used at a peak polymerization temperature from 320° C. to 350° C. In a further embodiment, the initiator comprises at least one peroxide group incorporated in a ring structure. Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723. A process for forming an ethylene-based polymer may comprise a combination of two or more embodiments as described herein.

Additives and Applications

An inventive composition may comprise one or more additives. Additives include, but are not limited to, crosslinking agents, coagents, cure boosters, coupling agents, antioxidants, ultraviolet absorbers, stabilizers, plasticizers, lubricants, antistatic agents, conductive agents, pigments, dyes, nucleating agents, fillers, slip agents, fire retardants, flame retardants, processing aids, smoke inhibitors, viscosity control agents, tackifiers, anti-blocking agents, surfactants, extender oils, acid scavengers, tree-retardants (e.g., polyethylene glycol, polar polyolefin copolymers, etc.), scorch retardants, and metal deactivators. Fillers include (but are not limited to) calcined clay, organo-clay and carbon black. Additives can be used in amounts ranging from less than 0.01 to more than 10 wt % based on the weight of the composition. The polymer composition may, for example, comprise less than or equal to 10% of the combined weight of one or more additives, based on the weight of the inventive polymer. In one embodiment the polymers of this invention are treated with one or more stabilizers, for example, antioxidants, such as IRGANOX 1010, IRGANOX 1076 and IRGAFOS 168. In general, the polymers are treated with one or more stabilizers before extrusion or other melt processes. An inventive composition may further comprise at least one other polymer, in addition to an inventive ethylene-based polymer. Blends and mixtures of the inventive polymer with other polymers may be prepared.

Crosslinking agents include, but are not limited to, any peroxide that will promote the crosslinking of the composition of this invention, including an organic peroxide. Exemplary peroxides include dicumyl peroxide; bis(alpha-t-butyl peroxyisopropyl)benzene; isopropylcumyl t-butyl peroxide; t butylcumylperoxide; di-t-butyl peroxide; 2,5-bis(t-butylperoxy)2,5-dimethylhexane; 2,5 bis(t-butylperoxy) 2,5-dimethylhexane-3; 1,1-bis(t-butylperoxy)3,3,5-trimethylcyclo-hexane; isopropylcumyl cumylperoxide; di(isopropylcumyl) peroxide; or mixtures thereof. Peroxide crosslinking agents are used in amounts of at least 0.5 wt % based on the weight of the composition. In various embodiments the peroxide crosslinking agent is used in an amount of 0.5-10, or 0.7-5 or 1-3 wt % based on the weight of the composition. The peroxides can be used alone or in combination with various other known coagents, cure boosters and scorch retardants, such as (but not limited to) triallyl isocyanurate; ethoxylated bisphenol A dimethacrylate; α-methyl styrene dimer (AMSD); and other coagents described in U.S. Pat. Nos. 5,346,961 and 4,018,852.

As an alternative, or in addition, to the use of peroxides for the crosslinking of the compositions of this invention, other approaches for crosslinking of polymers may be used to effect the desired degree of crosslinking. Such approaches and technologies are well known to those skilled in the art and include (but are not limited to) radiation crosslinking, moisture crosslinking, bisulfonyl azide crosslinking, crosslinking with hydroxyl terminated PDMS, etc. In some cases, it would be necessary for the polymers used in the practice of this invention to be functionalized appropriately to enable crosslinking (for example, with alkoxy silanes in the case of moisture crosslinking or crosslinking with hydroxyl terminated PDMS).

The polymers, polymer blends and compositions of this invention may also be employed in a variety of conventional thermoplastic fabrication processes, to produce useful articles, including, as discussed above, W&C applications, power and communication cables, extrusion coatings onto various substrates; monolayer and multilayer films; molded articles, such as blow molded, injection molded, or roto-molded articles; coatings; fibers; and woven or non-woven fabrics. An inventive polymer may be used in a variety of films, including but not limited to, food packaging, consumer, industrial, agricultural (applications or films), lamination films, clarity shrink films, collation shrink films, stretch films, silage films, greenhouse films, fumigation films, liner films, stretch hood films, heavy duty shipping sacks, pet food films, sandwich bags, sealants, and diaper backsheets.

Definitions

Unless stated to the contrary, implicit from the context, or customary in the art, all parts and percents are based on weight, and all test methods are current as of the filing date of this application. The term "high pressure, free radical polymerization process," as used herein, refers to a free radical polymerization process carried out at an elevated pressure of at least 1000 bar (100 MPa).

The term "composition," as used herein, includes a mixture of materials which comprise the composition, as well as reaction products and decomposition products formed from the materials of the composition.

The term "polymer" refers to a compound prepared by polymerizing monomers, whether of the same or a different type. The generic term polymer thus embraces the term homopolymer (which refers to polymers prepared from only one type of monomer, with the understanding that trace amounts of impurities can be incorporated into the polymer structure), and the term "interpolymer" as defined below. Trace amounts of impurities may be incorporated into and/or within the polymer. The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises 50 wt % or a majority amount of polymerized ethylene, based on the weight of the polymer, and, optionally, at least one comonomer. In one embodiment, the ethylene-based polymer comprises a majority amount of polymerized ethylene, based on the weight of the polymer. The term "ethylene-based interpolymer" refers to an interpolymer that comprises 50 wt % or a majority amount of polymerized ethylene, based on the weight of the interpolymer, and at least one comonomer. In one embodiment, the ethylene-based interpolymer comprises a majority amount of polymerized ethylene, based on the weight of the interpolymer. The term "ethylene-based copolymer" refers to a copolymer that comprises 50 wt % or a majority amount of polymerized ethylene, based on the weight of the interpolymer, and a comonomer as the only monomer types. In one embodiment, the ethylene-based copolymer comprises a majority amount of polymerized ethylene, based on the weight of the copolymer.

The term "make-up," when used herein, in reference to a reactant (i.e., "make-up ethylene," "make-up CTA"), refers to reactant provided from an external source(s), and not provided internally from a recycled source(s). For example, in an embodiment, ethylene is used as "make-up ethylene" required to compensate for the ethylene consumed by the polymerization and/or lost through, for example, purge from the process and residual ethylene in the polymer. A CTA make-up feed stream refers to a feed stream from an external CTA source.

The term "control system," as used herein, in reference to a polymerization process (for example, the feed system of a polymerization process) refers to an apparatus used to control and/or to adjust the composition and/or flow of a feed stream to a reaction zone. Examples of a control system include, but are not limited to, one or more valves (each having an inlet and an outlet), and one or more multi-way valves (i.e., a three-way or four-way valve).

For example, in one embodiment, a valve-control system controls the flow ratio of one or two or more feed streams (i.e., one or more ethylene-based feed streams), for example, the system controls the distribution of make-up ethylene, or recycle ethylene, or make-up CTA, over two or more feed streams to the reactor. Examples of a valve-control system is a system with two or more lines, each with an independent control valve or a multiple way control valve, distributing an inlet stream over two or more outlet streams.

The term "two port valve" or "two-way valve" refers to a valve with one inlet and one outlet, through which a fluid can flow through in either direction. The term "three port valve" or "three-way valve" refers to a valve with at least one inlet and at least one outlet, and where the sum of inlets and outlets equals three ports on the valve. The term "multiple-port valve" or "multiple way valve" refers to a valve with at least one inlet and at least one outlet, and where the sum of inlets and outlets equals the number of ports on the valve.

In one embodiment, a control system can be used for closed loop control, in which the flow ratio of make-up ethylene and/or the high pressure recycle ethylene is adjusted, to obtain the target MWD or other target product (polymer) properties. Alternatively, the quality measurement, for example, melt strength, melt elasticity or G', from an analyzer, can be used by the control system to adjust the composition of the ethylene feeds to the reaction zones. Alternatively, the flow ratio can be controlled manually, for instance depending on product analysis by a product analyzer, for example, typical laboratory apparatus to measure melt elasticity, melt strength, G', or optical properties. The set point of the "flow ratio controller" can be adjusted accordingly.

The terms "analyzer", or "on-line analyzer, or "at-line analyzer," as used, in reference to a polymerization process and/or a polymer isolation, refers to a device, incorporated with, and/or associated with, a reactor configuration, that measures the concentration of a reagent (for example a CTA) and/or a polymer property (for example, melt strength or melt elasticity, or other rheological property). Examples include, but are not limited to, Gas Chromatogram apparatus, Infrared Detector apparatus, and typical laboratory apparatus to measure, for example, melt elasticity, melt strength, G', or type and level of unsaturation.

The term "LCB frequency," as used herein, refers to the number of long chain branches (C6 and higher) formed per 500 ethylene molecules or 1000 total carbon atoms incorporated in the formed polymer. The term "SCB frequency," as used herein, reflects the number of short chain branches (C1, C2, C3, C4 and C5) formed per 500 ethylene molecules or 1000 total carbon atoms incorporated in the formed polymer.

The terms or "rheology modifying agent," or "branching agent," or "coupling agent," as used herein, refer to a multifunctional component, which is able to change the rheology of a polymer, for example, increase G' and melt strength, when incorporated into the polymer. Examples of rheology modifying agents include dienes, polyenes and monomeric chain transfer agents.

The phrase "mole fraction of make-up ethylene (or fresh ethylene) in the first ethylene-based feed stream to the first reaction zone (RZ1)," as used herein, refers to the molar amount of make-up ethylene, divided by the molar amount of ethylene plus optional components, such as comonomer(s) and/or CTA(s), fed to the first reaction zone.

The phrase "mole fraction of make-up ethylene in the last ethylene-based feed stream sent to the reactor configuration," as used herein, refers to the molar amount of make-up ethylene, divided by the molar amount of ethylene plus optional components, such as comonomer(s) and/or CTA(s), in the last ethylene-based feed stream sent to the reactor configuration.

The terms "ethylene-based feed stream" or "ethylene based feed" or "ethylene feed stream," or "ethylene feed," as used herein, refer to a feed stream to a reaction zone, and which contains a majority amount of ethylene, based on the molar amount of all of the components in the feed stream. Optionally one of more chain transfer agents, comonomers, other process components (like lubrication oil, solvent, etc.) and/or impurities (as for instance initiator degradation products) might be present in the feed stream.

The terms "ethylene-based feed components," or "ethylene-based feed stream components," as used herein, refer to ethylene (make-up and/or recycled), and optionally CTA (make-up and/or recycled), solvent (make-up and/or recycled), comonomer(s) (make-up and/or recycled) and/or other components (for example, including, but not limited to, make-up and/or recycled lubrication oil(s), antioxidant(s), ethane, methane and/or initiator dissociation products), added to a reaction zone at an inlet to the reaction zone. In one embodiment, the ethylene-based feed components comprise the following: ethylene (fresh and/or recycled), and optionally CTA (fresh and/or recycled), solvent (fresh and/or recycled), comonomer(s) (fresh and/or recycled) and/or other components selected from the following: fresh and/or recycled lubrication oil(s), antioxidant(s), ethane, methane, initiators (for example, oxygen) and/or initiator dissociation products.

The terms "inlet stream" or "reaction zone inlet stream," as used herein, refer to the total mass flow or total molar flow added at the inlet of the first reaction zone of the reactor. The terms "side stream" or "side feed stream," as used herein, refer to total mass flow or total molar flow added at the inlet of a reaction zone, downstream from the first reaction zone, and does not include the total mass flow or total molar flow from the previous reaction zone.

The term "polymerization system," as used herein, refers to the devices used to polymerize and isolate a polymer. Such devices include, but are not limited to, one or more reactors, reactor pre-heater(s), monomer-reactor cooling device(s), Hyper-compressor(s), Primary compressor(s), and/or Booster compressor(s).

The term "reactor configuration," as used herein, refers to one or more reactors, and optionally one or more reactor pre-heaters and one or more ethylene feed cooling devices, used to polymerize a polymer. Such reactors include, but are not limited to, autoclave reactor(s), tubular reactor(s), and combinations of autoclave and tubular reactors.

The term "inlet pressure" or "reactor inlet pressure", as used herein, refers to the pressure level at the first inlet of the first reaction zone.

The term "reaction zone," as used herein, refers to a zone in a reactor where polymerization reaction is initiated, or reinitiated, by the addition of free radicals, or components which dissociate into and/or generate free radicals. Typically, the reaction medium is heated and/or cooled by a heat transfer medium flowing through a jacket around the reactor. A reaction zone may also start with the addition of make-up and/or recycled ethylene, and free radicals or components, which dissociate into and/or generate free radicals.

The term "first reaction zone," as used herein, refers to the first reactor zone where the polymerization is initiated by the addition of radicals and/or components which dissociate into and/or generate radicals. The first (or other) reaction zone ends at the point where there is a new feed of radicals, and/or components which dissociate into and/or generate radicals, and, optionally, make-up and/or recycled ethylene and/or comonomer(s). The total number of reaction zones equals i.

The terms "subsequent reaction zone," "sequential reaction zone," or "reaction zone located downstream of the first reaction zone," as used herein, refer to a reactor zone which receives ethylene and polymer from a previous reactor zone, and where radicals or components, which dissociate into and/or generate, radicals, are added at the inlet of the subsequent (or sequential) reactor zone. The subsequent (or sequential) reaction zone ends at the point where there is a new feed of radicals and/or components, which dissociate into and/or generate, radicals; however, the last or ith reaction zone ends at the position of a pressure control device of the reactor system. The number of subsequent (or sequential) reaction zones is (i−1), where i is the total number of reaction zones. Optionally, a feed of make-up and/or recycled ethylene and/or other components like CTA's, and/or comonomers may also be added to a reaction zone.

The phrase "maximum temperature in a reaction zone," or "peak temperature," as used herein, refers to the highest temperature measured in a reaction zone, for example, in an autoclave reaction zone (typically, noted as a maximum zone or control temperature), and in a tubular reaction zone (typically noted as a peak temperature).

The term "Hyper compressor system" or "Secondary compressor system," "Hyper comp. system," or similar terms, as used herein, refers to a device that compresses a feed stream; for example, at least one of the following: a) the ethylene-based components coming from the HPR (High Pressure Recycle), and/or b) the ethylene-based components, each coming from the Primary compressor system, each to a pressure level required to feed the reactor at its inlet pressure. This compression can take place in one or multiple compression stages, and can be combined with intermediate cooling. The Hyper compressor system comprises a reciprocating plunger compressor, and can consist of single or multiple compressor frame(s). A Hyper compressor system containing a single frame can also be called a "Hyper compressor system." Hyper compressor (Hyper), or Secondary compressor, is a device that compresses the following: a) the ethylene-based components coming from the HPR (High Pressure Recycle), and/or b) the ethylene-based components coming from the Primary, each to a pressure level required to feed the reactor at its inlet pressure. This compression can take place in one or multiple compression stages, and can be combined with intermediate cooling. The Hyper comprises a reciprocating plunger compressor, and can consist of single or multiple compressor frame(s).

The "inlet section of a Hyper-compressor system" refers to one or more inlets to the hyper-compressor system, and wherein these inlet(s) are located at the suction side of the hyper compressor. One inlet may be divided over one or more cylinder plunger assemblies located in the first compression stage of the Hyper-compressor.

The "Primary compressor system," or similar terms, as used herein, refers to a device that compresses the following: a) the make-up ethylene, and/or b) the low pressure recycle coming from the Booster compression system, and/or c) the recycled compressor packing leaks, each to the pressure level required at the inlet side of the Hyper compressor system. This compression can take place in one or multiple compression stages, and can be combined with intermediate cooling. The Primary compressor system can consist of single or multiple compressor frames, and can be potentially combined with Booster compressor frame(s). A Primary compressor system generates one or more output flows. The output of the Primary compressor system contains the ethylene based flow from the low pressure separator(s) plus the make-up ethylene flow, and optionally recompressed packing leaks from the compressor system(s) used in polymerization. The Primary compressor system can consist of one or more Primary compressors. Typically a Primary compressor system compresses a flow from 40 bar to the discharge pressure of 300 bar. A Primary compressor system containing a single frame can also be called a "Primary compressor.". A Primary compressor system combined with a Booster compressor containing a single frame can also be called a "Booster/Primary compressor."

The term "recycled," when used herein, in reference to a reactant (i.e., "recycled ethylene," "recycled CTA"), refers to unreacted reactant, typically separated from the polymer in the high pressure separator(s) and/or the low pressure separator(s), and returned/compressed to the reactor configuration.

The term "CTA system" includes a single CTA, or a mixture of CTAs, added to the polymerization process, typically to control the melt index. A CTA system includes a component able to transfer a hydrogen atom to a growing polymer molecule containing a radical, by which a radical is formed on the CTA molecule, which can then initiate the growth of a new polymer molecule. CTA is also known as telogen or telomer.

The terms "CTA activity" or "chain transfer activity coefficient (Cs value)" as used herein, refers to the ratio between the "rate of chain transfer" to the "rate of ethylene propagation." The chain transfer activity constant (Cs) has been typically measured at 1360 atm, and 130° C., and Cs values can be taken from Mortimer, see "Mortimer references shown below, after Table 3.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. The term, "consisting essentially of" excludes from the scope of any succeeding recitation any other component, step, or procedure, excepting those that are not essential to operability. The term "consisting of" excludes any component, step, or procedure not specifically delineated or listed.

Test Methods

Density

Samples for density measurements are prepared according to ASTM D 4703-10. Samples are pressed at 374° F. (190° C.), for five minutes, at 10,000 psi (68 MPa). The temperature is maintained at 374° F. (190° C.) for the above five minutes, and then the pressure is increased to 30,000 psi (207 MPa) for three minutes. This is followed by a one minute hold at 70° F. (21° C.) and 30,000 psi (207 MPa). Measurements are made within one hour of sample pressing using ASTM D792-08, Method B.

Melt Index

Melt index (12 or $1_2$) is measured in accordance with ASTM D 1238-10, Condition 190° C./2.16 kg, Method B, and is reported in grams eluted per 10 minutes.

Nuclear Magnetic Resonance ($^{13}C$ NMR) for C6+ and Carbonyl Level

Samples are prepared by adding approximately "3 g" of a "50/50 mixture of tetrachloroethane-d2/orthodichlorobenzene, containing 0.025 M $Cr(AcAc)_3$," to a "0.25 to 0.40 g" polymer sample, in a 10 mm NMR tube. Oxygen is removed from the sample by purging the tube headspace with nitrogen. The samples are dissolved and homogenized by heating the tube and its contents to 145-150° C. using a heating block and heat gun. Each sample is visually inspected to ensure homogeneity. All data are collected using a Bruker 400 MHz spectrometer. The data is acquired using a six second pulse repetition delay, 90-degree flip angles, and inverse gated decoupling, with a sample temperature of 120° C. All measurements are made on non-spinning samples in locked mode. Samples are allowed to thermally equilibrate for seven minutes, prior to data acquisition. The 13C NMR chemical shifts are internally referenced to the EEE triad at 30.0 ppm. The "C6+" value is a direct measure of C6+ branches in LDPE, where the long branches are not distinguished from "chain ends." The "32.2 ppm" peak, representing the third carbon from the end of all chains or branches of six or more carbons, is used to determine the "C6+" value. Total carbonyls are all carbonyls, including those from carbon monoxide, chain transfer agents, esters, and so forth. When determining the overall (or total) carbonyl content, including carbonyl derived from carbon monoxide and other "carbonyl-containing compounds (for example, acrylates and vinyl acetate)," the signal frequencies corresponding to such compounds are also considered. Such frequencies are known by those of ordinary skill in the art.

Nuclear Magnetic Resonance ($^1H$ NMR) for Unsaturation

Sample Preparation:

The samples are prepared by adding approximately 130 mg of sample to "3.25 g of 50/50, by weight, tetrachloroethane-d2/perchloroethylene" with 0.001 M $Cr(AcAc)_3$, in a NORELL 1001-7, 10 mm NMR tube. The samples are purged by bubbling N2 through the solvent, via a pipette inserted into the tube, for approximately five minutes, to prevent oxidation. Each tube is capped, sealed with TEFLON tape, and then soaked at room temperature, overnight, to facilitate sample dissolution. The samples are kept in a N2 purge box, during storage, before, and after, preparation, to minimize exposure to O2. The samples are heated and vortexed at 115° C. to ensure homogeneity.

Data Acquisition Parameters:

The 1H NMR is performed on a Bruker AVANCE 400 MHz spectrometer, equipped with a Bruker Dual DUL high-temperature CryoProbe, and a sample temperature of 120° C. Two experiments are run to obtain spectra, a control spectrum to quantitate the total polymer protons, and a double presaturation experiment, which suppressed the intense polymer backbone peaks, and enabled high sensitivity spectra for quantitation of the end-groups. The control is run with ZG pulse, 4 scans, AQ 1.64 s, $D_1$ 14 s. The double presaturation experiment is run with a modified pulse sequence, 100 scans, DS 4, AQ 1.64 s, presaturation delay 1 s, relaxation delay 13 s. Data Analysis—1HNMR Calculations: The signal from residual 1H in TCE (Tetrachloroethane)-d2 (at 6.0 ppm) is integrated, and set to a value of 100, and the integral from 3 to −0.5 ppm is used as the signal from the whole polymer in the control experiment. For the presaturation experiment, the TCE signal is also set to 100, and the corresponding integrals for unsaturation (vinylene at about 5.40 to 5.60 ppm, trisubstituted at about 5.16 to 5.35 ppm, vinyl at about 4.95 to 5.15 ppm, and vinylidene at about 4.70 to 4.90 ppm) are obtained. In the presaturation experiment spectrum, the regions for cis- and trans-vinylene, trisubstituted, vinyl, and vinylidene are integrated. The integral of the whole polymer from the control experiment is divided by two, to obtain a value representing X thousands of carbons (i.e., if the polymer integral=28,000, this represents 14,000 carbons, and X=14). The unsaturated group integrals, divided by the corresponding number of protons contributing to that integral, represent the moles of each type of unsaturation per X thousand carbons. Dividing the moles of each type of unsaturation by X, then gives the moles of unsaturated groups per 1000 moles of carbons.

Melt Strength

Melt strength measurements are conducted on a GOTTFERT RHEOTENS 71.97 (Giettfert Inc.; Rock Hill, S.C.), attached to a GOTTFERT RHEOTESTER 2000 capillary rheometer. The melted sample (about 25 to 30 grams) is fed with the GOETTFERT RHEOTESTER 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston is run at a constant piston speed of 0.265 mm/second. The standard test temperature is 190° C. The sample is drawn uniaxially to a set of accelerating nips, located 100 mm below the die, with an acceleration of 2.4 mm/s². The tensile force is recorded as a function of the take-up speed of the nip rolls. Melt strength is reported as the plateau force (cN), before the strand broke. The following conditions are used in the melt strength measurements: plunger speed=0.265 mm/second; wheel acceleration=2.4 mm/s²; capillary diameter=2.0 mm; capillary length=30 mm; and barrel diameter=12 mm.

Hexane Extractables

Polymer pellets (from the polymerization, pelletization process without further modification) are pressed in a Carver Press, at a thickness of 3.0-4.0 mils (approximately 2.2 grams of pellets pressed into a film). The pellets are pressed at 190° C., for three minutes, at 3,000 lbf, and then at 190° C., for three minutes, at 40,000 lbf. Non-residue gloves (PIP*CleanTeam*Cotton Lisle Inspection Gloves, Part Number: 97-501) are worn, so as to not contaminate films with residual oils from the hands of the operator. Films are cut into "1 inch×1 inch" squares, and weighed. Enough film samples are used, such that "2.5 g" of film samples are used for each extraction. The films are then extracted for two hours, in a hexane vessel containing about 1000 ml of hexane, at "49.5±0.5° C.," in a heated water bath. The hexane used, is an isomeric "hexanes" mixture (for example, Hexanes (Optima), Fisher Chemical, High purity mobile phase for HPLC and/or extraction solvent for GC applications, 99.9% min by GC). After two hours, the films are removed, rinsed in clean hexane, initially dried with nitrogen, and then further dried in a vacuum oven (80±5° C.) at full vacuum (ISOTEMP Vacuum Oven, Model 281A at approximately 30 inches Hg) for two hours. The films are then placed in a desiccator, and allowed to cool to room temperature for a minimum of one hour. The films are then reweighed, and the amount of mass loss due to extraction in hexane is calculated. The [(amount of mass loss/initial weight of film)×100]=the weight percent of hexane extractable.

Triple Detector Gel Permeation Chromatography (TDGPC)—Conventional GPC Data

A Triple Detector Gel Permeation Chromatography (3D-GPC or TDGPC) system consisting of a Polymer Laboratories (now Agilent) high temperature chromatograph Model 220, equipped with a 2-angle laser light scattering (LS) detector Model 2040 (Precision Detectors, now Agilent), an IR-4 infra-red detector from Polymer Char (Valencia, Spain), and a 4-capillary solution viscometer (DP) (VISCOTEK, now Malvern) is used. Data collection is performed using a Polymer Char DM 100 data acquisition box and related software (Valencia, Spain). The system is also equipped with an on-line solvent degassing device from Polymer Laboratories (now Agilent).

High temperature GPC columns consisting of four 30 cm, 20 um, mixed A LS columns from Polymer Laboratories (now Agilent) are used. The sample carousel compartment is operated at 140° C., and the column compartment is operated at 150° C. The samples are prepared at a concentration of "0.1 grams of polymer in 50 milliliters of solvent." The chromatographic solvent and the sample preparation solvent is 1,2,4-trichlorobenzene (TCB) containing 200 ppm of 2,6-di-tert-butyl-4methylphenol (BHT). The solvent is sparged with nitrogen. The polymer samples are gently stirred at 160° C. for four hours. The injection volume is 200 microliters. The flow rate through the GPC is set at 1.0 ml/minute.

Column calibration and sample molecular weight calculations are performed using Polymer Char "GPC One" software. Calibration of the GPC columns is performed with 21 narrow molecular weight distribution polystyrene standards. The molecular weights of the polystyrene standards ranged from 580 to 8,400,000 g/mol, and are arranged in six "cocktail" mixtures, with at least a decade of separation between the individual molecular weights. The peak molecular weights of polystyrene standards are converted to polyethylene molecular weights using the following equation (as described in Williams and Ward, J. Polym. Sci., Polym. Let., 6, 621 (1968)): $M_{polyethylene}=A(M_{polystyrene})^B$, here B has a value of 1.0, and the experimentally determined value of A is around 0.38 to 0.44. The column calibration curve is obtained by fitting a first order polynomial to the respective polyethylene-equivalent calibration points, obtained from the above Equation, to the observed elution volumes.

Number, weight, and z-average molecular weights are calculated according to the following:

$$\overline{Mn} = \frac{\sum_i Wf_i}{\sum_i (Wf_i/M_i)}, \overline{Mw} = \frac{\sum_i (Wf_i * M_i)}{\sum_i Wf_i}, \overline{Mz} = \frac{\sum_i (Wf_i * M_i^2)}{\sum_i (Wf_i/M_i)},$$

where, $Wf_i$ is the weight fraction of the i-th component and $M_i$ is the molecular weight of the i-th component. The molecular weight distribution (MWD) is expressed as the ratio of the weight average molecular weight (Mw) to the number average molecular weight (Mn).

The above A value is determined by adjusting the A value in the Williams and Ward Equation, until Mw, the weight average molecular weight, calculated using the above Equation, and the corresponding retention volume polynomial, agreed with the independently determined value of Mw, obtained in accordance with the linear homopolymer reference with known weight average molecular weight of 115, 000 g/mole.

Rheological G'

The sample used in the G' measurement is prepared from a compression molding plaque. A piece of aluminum foil is placed on a backplate, and a template or mold is placed on top of the backplate. Approximately 12 grams of resin is placed in the mold, and a second piece of aluminum foil is placed over the resin and mold. A second backplate is then placed on top of the aluminum foil. The total ensemble is put into a compression molding press, which is run at the following conditions: 3 minutes at 150° C., at 10 bar pressure, followed by 1 minute at 150° C., at 150 bar, followed by a "1.5 minutes" quench cooling to room temperature, at 150 bar. A "25 mm disk" is stamped out of the compression-molded plaque. The thickness of this disk is approximately 2.0 mm. The rheology measurement to determine G' is done in a nitrogen environment, at 170° C., and a strain of 10%. The "stamped out disk" is placed between the two "25 mm" parallel plates, located in an ARES-1 (Rheometrics SC) rheometer oven, which is preheated, for at least 30 minutes, at 170° C., and the gap of the "25 mm" parallel plates is slowly reduced to 1.65 mm. The sample is then allowed to remain for exactly five minutes at these conditions. The oven is then opened, the excess sample is carefully trimmed around the edge of the plates, and the oven is closed. The storage modulus and loss modulus of the sample are measured via a small amplitude, oscillatory shear, according to a decreasing frequency sweep from 100 to 0.1 rad/s (when able to obtain a G" value lower than 500 Pa at 0.1 rad/s), or from 100 to 0.01 rad/s. For each frequency sweep, 10 points (logarithmically spaced) per frequency decade are used. The data are plotted (G' (Y-axis) versus G" (X-axis)) on a log-log scale. The Y-axis scale covered the range from 10 to 1000 Pa, while the X-axis scale covered the range from 100 to 1000 Pa. Orchestrator software, Version 7.2.2.1, is used to select the data in the region where G" is between 200 and 800 Pa (or using at least 4 data points). The data are fit to a log polynomial model using the fit equation $Y=C1+C2 \ln(x)$. Using the Orchestrator software, G' at G" equal to 500 Pa is determined by interpolation. In some cases, the G' (at a G" of 500 Pa) is determined from test temperatures of 150° C. and 190° C. The value at 170° C. is calculated from a linear interpolation from the values at these two temperatures.

Preparation of Crosslinkable (Peroxide-Containing) Polymer Compositions

For the purpose of dissipation factor measurements of the polymers, as well as assessment of their crosslinking characteristics, 1.8 wt % dicumyl peroxide is imbibed in the polymer pellets as follows: (a) the polymer pellets are pre-heated in a glass jar at 60° C. for 2 hours; (b) dicumyl peroxide, which has been pre-heated separately to 60° C. (above its melting point of 40° C.), is sprayed onto pre-heated pellets using a syringe, and the jar is tumble blended for 10 minutes at room temperature; (c) the jar is placed back in the oven at 60° C. for 40 hours; and (d) the jar is removed from the oven, and tumble blended again at room temperature for 10 minutes. The resulting pellets containing peroxide are subsequently evaluated in a moving die rheometer, and are used to make compression molded specimens for other tests. For electrical (dissipation factor) measurements, completely crosslinked specimens of 50 mil (1.3-mm) thickness are prepared, by compression molding of the compositions at the following conditions: 500 psi (3.5 MPa) at 125° C. for 3 minutes, followed by 2500 psi (17 MPa) at 180° C. for 20 minutes, cooling to 30° C. at this pressure, and opening the press to remove the molded plaques. Specimens for dissipation factor measurements are cut from the molded (crosslinked) plaques.

Testing of Crosslinking Characteristics by Moving Die Rheometer (MDR)

Moving Die Rheometer ("MDR") analyses are performed on crosslinkable (peroxide-containing) polymeric compositions using an Alpha Technologies Rheometer MDR model 2000 unit. Testing is based on ASTM procedure D5289. The MDR analyses are performed using six grams of material. Samples are tested at 182° C. or at 140° C., at 0.5 degrees arc oscillation for both temperature conditions. Samples are tested on material directly from a Brabender mixing bowl. Rate of crosslinking is assessed by ts1 (time for 1 lb-in increase in elastic torque) at 140° C. or 182° C. The ultimate degree of crosslinking is reflected by MH (maximum elastic torque)–ML (minimum elastic torque) at 182° C.

Dissipation Factor (DF)

Dissipation factor ("DF") testing, at 60 Hz and 2 kV applied voltage, is conducted on crosslinked 50-mil (1.3-mm) thick specimens. The specimens are degassed in a vacuum oven, at 60° C., for five days. DF testing is carried out according to ASTM D150, at 60 Hz, on a GUILDLINE High Voltage Capacitance Bridge unit, Model 9920A, with a TETTEX specimen holder and a TETTEX AG Instruments Temperature Control Unit. Samples are tested at 60 Hz and 2 kV applied voltage, at temps. of 25° C., 40° C., 90° C., and 130° C. DF measurements at these conditions—typically used for medium voltage wire and cables.

EXPERIMENTAL

Polymerization Simulations

A polymerization simulation model, with applied reaction scheme and kinetics, is described by Goto et al. (see below). Other reactor and product modeling frameworks are available through Aspen Plus of Aspen Technology, Inc., Burlington, Mass., USA; and PREDICI of Dr. Wulkow Computing in Technology GmbH (CiT), Rastede, Germany.

Process and product responses, predicted by these model frameworks, are determined by the reactor parameters, the applied reaction scheme and kinetic parameters. The applied reaction scheme and kinetic parameters are described below.

The polymerization simulations were achieved with the Goto LDPE simulation model as described in the following: S. Goto et al.; *Journal of Applied Polymer Science: Applied Polymer Symposium*, 36, 21-40, 1981 (*Title: Computer model for commercial high pressure polyethylene reactor based on elementary reaction rates obtained experimentally*). The kinetic data used by "Goto et al." was derived from high pressure free radical polyethylene polymerization experiments, performed at varying temperature, pressure and polymer concentration, as described in the following: K. Yamamoto, M. Sugimoto; *Rate constant for long chain-chain branch formation in free-radical polymerization of ethylene; J Macromol. Science-Chem.*, $A$13 (8), pp. 1067-

1080 (1979). The following elementary reaction steps are described by Goto et al.: i) propagation of ethylene, ii) termination of radicals, iii) backbiting or SCB formation, iv) transfer to polymer or LCB formation, v) beta elimination of secondary radicals leading to vinyl formation, and vi) beta elimination of tertiary radicals leading to vinylidene formation. See Table 1 for kinetic data for main reactions, where ko is the preexponential or frequency factor; Ea is the activation energy, reflecting the temperature dependence; and $\Delta V$ is the activation volume, reflecting the pressure dependence. All kinetic constants are from Goto et al., except the ko, Ea and $\Delta V$ values for backbiting, which have been optimized to better reflect the level of methyl branches (as analyzed by the $^{13}C$ NMR technique) in high pressure polyethylene, as a function of pressure and temp. conditions.

TABLE 1

Kinetic Constants for Main Reactions

| Reaction | ko [m³/(hr*kmol] | Ea cal/mol | $\Delta V$ cc/mol |
|---|---|---|---|
| Propagation | 5.63E+11 | 10,520 | −19.7 |
| Termination | 3.0E+11 | 3,000 | 13.0 |
| Backbiting | 2.6E+12 | 12,130 | −14.0 |
| Transfer to Polymer | 1.75E+12 | 14,080 | 4.4 |
| Beta Elimination of Secondary Radical | 5.82E+11 | 15,760 | −22.6 |
| Beta Elimination of Tertiary Radical | 8.51E+10 | 14,530 | −19.7 |

The kinetic data for selected CTAs and comonomers are given in Table 2A and Table 2B. The kinetic constants were calculated with the kinetic constants of the Cs-value (ks/kp), as determined by Mortimer (see references after Table 3), and the ethylene propagation kinetics as given by Goto et al. (see Table 1 above). Unsaturation in the polymer can be formed through the following reaction steps: a) Termination by disproportionation of radicals leading to formation of a vinyl group located at the end of a polymer chain (backbone or long chain branch), b) Beta Elimination of Secondary Radical leading to formation of a vinyl group located at the end of a polymer chain (backbone or long chain branch), c) Beta Elimination of Tertiary Radical leading to formation of a vinylidene group located at the end of a polymer chain (backbone or long chain branch), d) Use of Propylene as chain transfer agent leading to formation of a vinyl group located at the end of a polymer chain, e) Use of Butene-1 as chain transfer agent leading to formation of a vinyl or trans-vinyl (R—CH=CH—CH$_3$) group located at the end of a polymer chain.

For crosslinking purposes, through processing with added peroxides, in wire cable applications, chain end-vinyls, are preferred over internal unsaturations (like vinylidene and trans-vinyls). Typically the reaction step of Beta Elimination of Tertiary Radicals generates two to three times more vinylidene unsaturation (0.2 to 0.4/1000 C) than the reaction step of Beta Elimination of Secondary Radicals, which will generate vinyl groups (0.05 to 0.15/1000 C). The contribution of Termination, by disproportionation of radicals to vinyl formation, is low and less than 0.05/1000 C, due to low initiator consumption, and the additional termination by radicals through combination, which will not yield vinyl groups. The use of propylene as chain transfer agent gives, depending on the propylene concentration needed to control the product melt index, a contribution to the end-vinyls in the range of 0.1 to 0.5/1000 C. The overall vinyl/vinylidene ratio of the polymer is an important parameter for predicting and controlling the peroxide crosslinking step. The higher the vinyl level and/or the vinyl/vinylidene ratio, the more efficient the crosslinking will be, meaning that less peroxide is needed, and less carbonyls are introduced and/or incorporated in the final polymer, to be used in demanding wire cable applications.

TABLE 2A

Kinetic Constants for Selected CTAs

| | Chain Transfer to Modifier | | | Cs value at 1360 atm and 130° C. |
|---|---|---|---|---|
| Component | ko [m³/(hr*kmol)] | Ea cal/mol | $\Delta V$ cc/mol | Cs = ks/kp |
| Propylene (CTA) | 2.2E+11 | 13,220 | −16.7 | 0.0122 |
| Butene-1 | 2.3E+11 | 11,620 | −16.7 | 0.047 |

TABLE 2B

Reactivity ratios for selected comonomers

| | Reactivity Ratios | |
|---|---|---|
| Component | $r_1$ ($k_{11}/k_{12}$) | $r_2$ ($k_{22}/k_{21}$) |
| Propylene (CTA) | 3.10 | 0.77 |
| Butene-1 | 3.4 | 0.86 |
| Vinyltrimethylsilane | 0.8 | 0.9 |

The rheology modifying and/or crosslinking agents can be modeled as bifunctional agents having a carbon-carbon double bond A and a carbon-carbon double bond B. The rheology modifying and/or crosslinking agents can be described, and modeled, through assigning kinetic $r_1$ and $r_2$ reactivity ratios (see Tables 3 below). The kinetic $r_1$ and $r_2$ reactivity ratios are, by definition, linked to the ethylene propagation kinetics for their temperature (Ea) and pressure ($\Delta V$) dependencies. The simulation examples do not include the use of the rheology modifying agents, however the rheology modifying and/or crosslinking agents can be used, in combination, with the simulated and/or claimed process conditions, in order to further enhance the rheological properties like melt strength and G'. The use of a rheology modifying agent can be very helpful to prevent, for instance, sagging of the plastic cable around the wire, while the use and incorporation of 1-7 octadiene will additionally increase the end-vinyl level and the vinyl/vinylidene ratio in the product.

TABLE 3

Reactivity Ratios for Rheology modifying Agents

| | | Reactivity Ratios | | Molecular weight g/mol | Boiling point ° C. |
|---|---|---|---|---|---|
| | | $r_1$ ($k_{11}/k_{12}$) | $r_1$ ($k_{11}/k_{12}$) | | |
| Di-allyl ether | Allyl (A) ether | 4 | 0.06 | 98.14 | 94-95 |
| | Allyl (B) ether | 4 | 0.06 | | |
| 1-7 Octadiene | Bond A | 3 | 0.8 | 110.2 | 114-121 |
| | Bond B | 3 | 0.8 | | |

Chain transfer activity and comonomer reactivity data are described in the following: L. Boghetti, G. Mortimer and G. Daues, Journal of Polymer Science, *Free-radical copolymerization of α-olefins with ethylene*, Vol. 61, p 3-8 (1962), G. Mortimer, Polymer Letters, *Free radical copolymeriza-* tion of ethylene, Vol. 3, p 343-344 (1965); P. Ehrlich, G. A. Mortimer, *Fundamentals of the free radical polymerization of ethylene*, Adv. Polymer Sci., Vol. 7, 386-448 (1970); G. Mortimer, Journal of Polymer Science: Part A-1; *Chain transfer in ethylene polymerization*; Vol. 4, p 881-900 (1966); G. Mortimer, Journal of Polymer Science: Part A-1, *Chain transfer in ethylene polymerization. Part IV Additional study at* 1360 atm *and* 130° C.; Vol. 8, p 1513-1523 (1970); G. Mortimer, Journal of Polymer Science: Part A-1, *Chain transfer in ethylene polymerization. Part V The effect of temperature*; Vol. 8, p 1535-1542 (1970); G. Mortimer, Journal of Polymer Science: Part A-1, *Chain transfer in ethylene polymerization Part V The effect of pressure*, Vol. 8, p 1543-1548 (1970); and G. Mortimer, Journal of Polymer Science: Part A-1, *Chain transfer in ethylene polymerization VII. Very reactive and depleteable transfer agents*, Vol. 10, p 163-168 (1972).

Description of Flow Diagram

FIG. 1 shows a generalized flow scheme of a simulated high pressure polymerization configuration containing a tubular reactor. Stream (1) is the make-up ethylene, which is compressed together with the outlet of the Booster by the Primary to stream (2). Stream (18) is the high pressure recycle stream containing unconverted ethylene, optional comonomer(s), chain transfer agent(s), etc., coming from stream (17). Stream (2) and Stream (18) are fed to the "Secondary compressor and Reactor system" block. After finishing the reaction, and having applied cooling, the reaction mixture, containing produced polymer, unconverted ethylene, optional comonomer(s) and chain transfer agent(s) and other components, is depressurized and/or cooled in (10), and separated in the high pressure separator (HIPS). The HPS separates the reaction mixture into an ethylene rich stream (15), containing minor amounts of waxes and/or entrained polymer, and a polymer rich stream (11) which is sent for further separation to the LPS. Ethylene-based stream (15) is cooled and cleaned in stream (17). Stream (16) is a purge stream to remove impurities and/or inerts.

The polymer separated in the LPS is further processed in (12). The ethylene and other components removed in the LPS (13) is fed to the Booster, where, during the compression, condensables, such as solvent, optional comonomer(s), lubrication oil and others, are collected and removed through stream (14). The outlet of the Booster is combined with make-up ethylene stream (1), and further compressed by the Primary to form stream (2).

Figure 2:
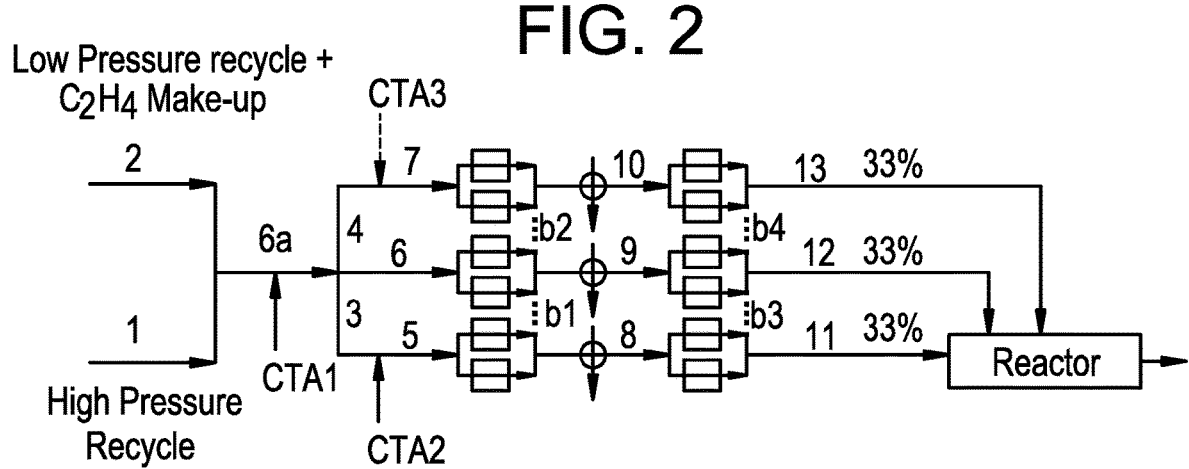
FIG. 2 depicts a polymerization system used in comparative polymerizations CP1, CP2, CP3, CP31, CP32, CP4 and CP41.

FIG. 2 shows the flow scheme of an ethylene-based feed distribution (33/33/33/0) with three ethylene-based feeds of ⅓ each. The Hyper compressor system has a total of twelve cylinders equally divided over the first and second compression stages. The HPR flow with a high level of unconverted CTA and optionally comonomer (line 1) is mixed up with the LPR and ethylene make-up (line 2), having a low unconverted CTA level, in line 6a and is be distributed over line 5, line 6 and line 7 through line 3 and line 4. Line 5, line 6 and line 7 handle equal flows size and compositions. This equal flow size and composition are maintained in the intermediate lines 8, 9 and 10, and up to the reactor through line 11, 12 and 13. The intermediate or interstage lines are equipped with interstage coolers, in order to cool down the ethylene-based flow after the first compression before heating by the second compression stage. Optionally the secondary compressors discharge lines might be equipped with balancing lines b1, b2, b3 and b4. These balance lines will not affect the composition in line 8, 9 and 10 and line 11, 12 and 13, due to the equal compositions in these lines. Furthermore the flow movements through these lines are limited by the "pulse wise" and "to and fro" flow movement, the reduced diameter of and/or presence of restricted orifices in these balance lines. In the shown flow scheme, the suction, intermediate and discharge hyper, and reactor flows, are split up molar in ⅓, ⅓ and ⅓ of the total ethylene-based feed flow to the hyper compressor and the reactor. Stream 11 is sent to the front reactor, where after preheating to the desired start temperature, it enters the first reaction zone. Initiator is injected at the start of the first reaction zone. Stream 12 and stream 13, are after optional cooling, sent, respectively, to the inlet of the second and third reaction zones. Each reaction zone receives the outlet of the previous reaction zone, and optionally an additional ethylene based feed flow, and/or optionally a comonomer and/or CTA feed. At the start of each reaction zone, an initiator system is injected or fed indirectly by injection of initiator in optional ethylene based, comonomer and/or chain transfer agent feed at the beginning of the reaction zone. Make-up CTA can be fed through line CTA1, CTA2 and/or CTA3. Optionally comonomer can be fed into each feed stream to a reaction zone and/or directly into a reaction zone. The CTA system can consist of single and/or multiple components and includes varying compositions.

Figure 3:
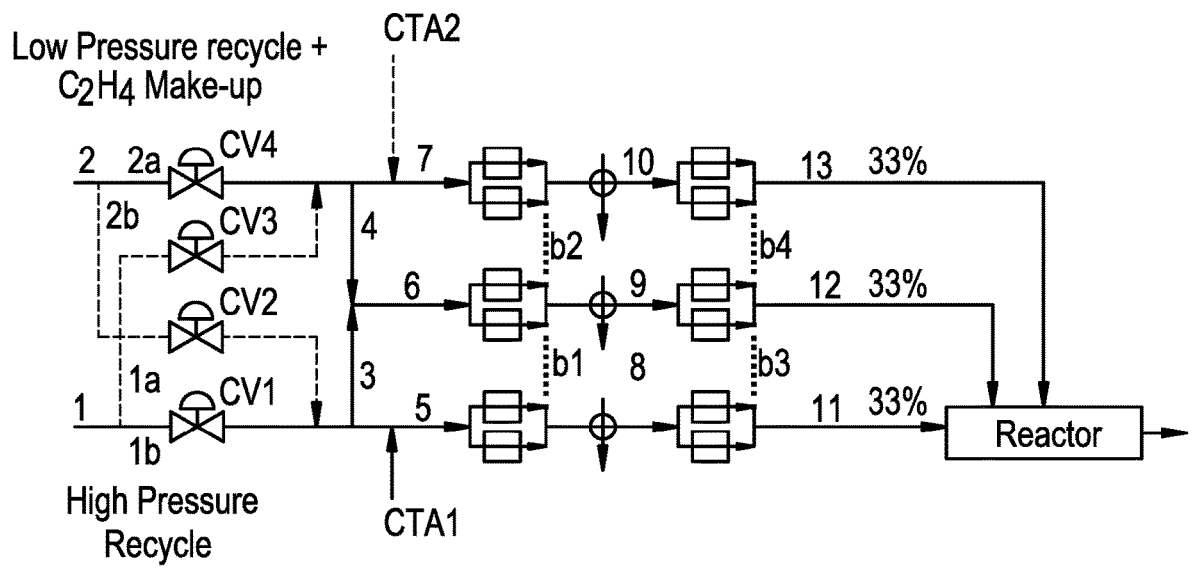
FIG. 3 depicts a polymerization system used in inventive polymerizations IP11, IP12, IP21, IP22, IP23, IP31, IP32, IP41 and IP42; flexible control of fresh ethylene and CTA.

FIG. 3 shows the flow scheme with three ethylene-based feed distributions (33/33/33/0). The Hyper compressor system has a total of twelve cylinders equally divided over the first and second compression stages. The HPR flow 1 with a high level of unconverted CTA and optionally comonomer (line 1) is kept separated from stream 2 containing the Low Pressure recycle and Ethylene make-up. Stream 2 has a low level of unconverted CTA and optionally comonomer.

CV1, CV2, CV3 and CV4 are control valves. Designations 1a and 1b are lines to change/control the distribution of stream 1 and stream 2 over the suction flows 5, 6 and 7 of the hyper compressor level. The following control scenarios of distributing stream 1 and 2 over the hyper suction streams 5, 6 and 7 are possible: A) when CV2 and CV3 are closed, line 5 will receive an ethylene-based flow from line 1 and line 7 will receive an ethylene-based flow from stream 2. Stream 6 will receive ethylene-based flows from stream 1 and optionally stream 2; B) when CV1 and CV4 are closed, line 5 will receive an ethylene-based flow from line 2 and line 7 will receive an ethylene-based flow from stream 1. Stream 6 will receive an ethylene-based flow from stream 1 and optionally stream 2; C) when the position of CV1, CV2, CV3 and CV4 are controlled, stream 1 and stream 2 can be freely distributed over line 5 and 7, while stream 6 will receive ethylene-based flows from streams 1 and 2.

In all of the above cases, balancing of feed streams to line 5, 6 and 7 can occur through line 3 and 4. The intermediate or interstage lines are equipped with interstage coolers, in order to cool down the ethylene-based flow, after the first compression, and before heating the ethylene-based flow by the second compression stage. Optionally the secondary compressor discharge lines might be equipped with balancing lines b1, b2, b3 and b4. These balance lines will have a minor effect on the composition in line 8, 9 and 10 and line 11, 12 and 13, due to the limited flow movements through these lines are limited by the "pulse wise" and "to and fro" flow movement, the reduced diameter of, and/or presence of, restricted orifices in these balance lines. In the shown flow scheme, the suction, intermediate and discharge hyper and reactor flows are split up molar in ⅓, ⅓ and ⅓ of the total ethylene-based feed flow to the hyper compressor and the reactor. Stream 11 is sent to the front reactor, where after preheating to the desired start temperature, it enters the first reaction zone. Initiator is injected at the start of the first reaction zone. Stream 12 and stream 13, are, after optional cooling, sent respectively to the inlet of the second and third reaction zones. Each reaction zone receives the outlet of the previous reaction zone, and optionally an additional ethylene based feed flow, a CTA feed and/or a comonomer feed. At the start of each reaction zone, an initiator system is injected, or fed indirectly by injection of initiator in optional ethylene based, comonomer and/or chain transfer agent flow fed, at the beginning of the reaction zone. Make-up CTA can be fed through line CTA1 and/or CTA2. Optionally, comonomer can be fed into each feed stream to a reaction zone and/or directly into a reaction zone. The CTA system can consist of single and/or multiple components, and include varying compositions.

Figure 4:
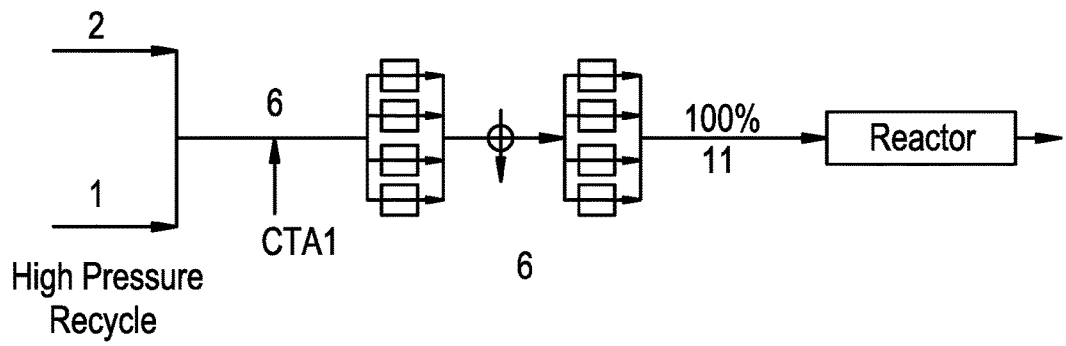
FIG. 4 depicts a polymerization system used in comparative polymerizations CP5 and CP6.

FIG. 4 shows the flow scheme where the total ethylene based feed flow is only distributed to the first reaction zone. The High Pressure Recycle (HPR) flow (line 1) is mixed with the "combined Low Pressure Recycle and make-up ethylene (line 2)," to form (line 6), which is sent to the suction of the Hyper compressor system. The discharge flow from the Hyper compressor system (line 11) is sent to the first reaction zone of the reactor. Make-up CTA (CTA1) is added into the process, at the suction of the Hyper compressor, and can be optionally fed at the inter-section between the first and second stages, or at the discharge of the hyper compressor system, or in line 1 and/or 2, or in lines connected to line 1 and/or 2.

Figure 5:
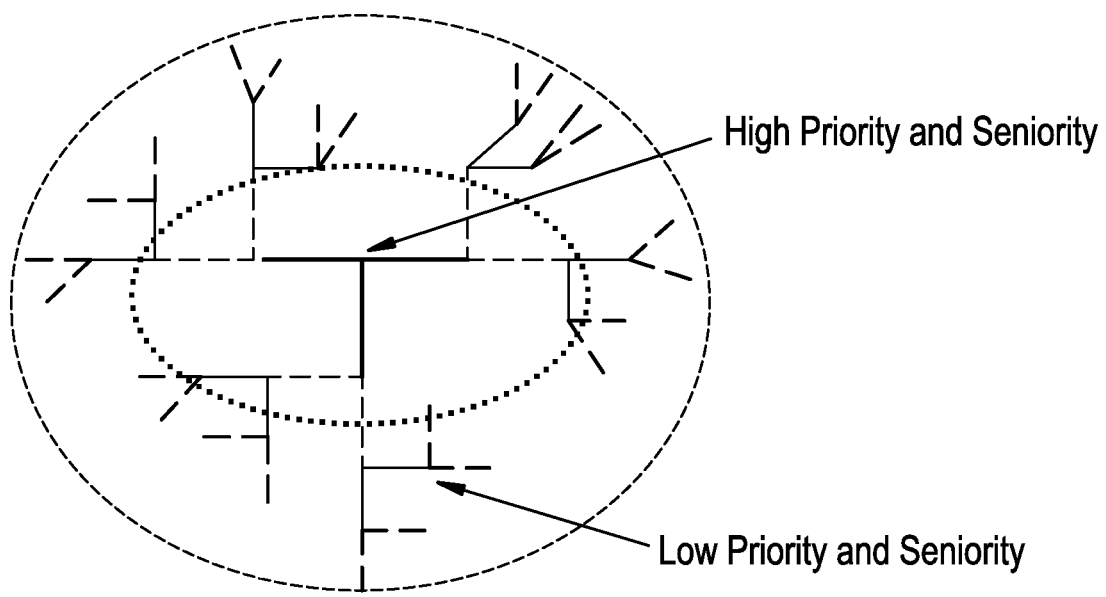
FIG. 5 depicts a schematic of the different types of branching segments in a LDPE.

FIG. 1, in combination with FIG. 2, was used for Examples: CP1, CP2, CP3, CP31, CP32, CP4 and CP41 of Table 4. FIG. 1, in combination with FIG. 3, was used for Examples: IP11, IP12, IP21, IP22, IP23, IP 31, IP 32, IP41 and IP42 of Table 4. FIG. 1, in combination with FIG. 4, was used for Examples: CP5 and CP6 of Table 4. As shown in Tables 5 and 6 below, the inventive examples can be beneficially used in various polyethylene product applications. For example IP11, versus CP1, has narrower MWD, in combination with a higher vinyl level of the starting polymer (higher priority and seniority), leading to a polymer with improved optical properties, improved down gauging, and potentially lower crosslinking tendency, due to the lower vinyl content in lower priority and seniority positions, as indicated by the product properties of polymer made at the last peak temperature. The overall vinyl level is the same; however the vinyls are better located, with higher priority and seniority, and are thus less accessible to crosslinking radicals. Another example is IP12, versus CP1, showing a broader MWD product, with a higher level of apparent vinyl unsaturation. A higher apparent vinyl level can be achieved by positioning the vinyls in the long chain branches with lower priority and seniority in large polymer molecules. This will make the vinyls more accessible to radicals in the crosslinking step. Furthermore, the higher vinyl content, in the low molecular weight material produced in the last reaction zone, will ensure a better participation of these molecules in the final crosslinked structure. The broader MWD, and consequently the higher melt strength, is beneficial to decrease shear-heating in melt extrusion of "peroxide-containing compositions" in cable extrusion, and to reduce sagging of the polymer around the conductive wire post-extrusion (that is, in the continuous vulcanization part of the process, before complete crosslinking is attained). The inventive control system allows the control of MWD, and distribution of the unsaturation in the polymer (inter and intramolecular), in order to match the product to the application need. The concept of priority and seniority is explained in the following reference from Reid, McLeish, *Macromolecules* 2001, 34, 1928-1945. See also FIG. 5.

Examples IP21, CP2, IP22 and IP23 shows similar trends as IP11, CP1 and IP12 examples. These products are made at 32% conversion level, while operating, in each example, all reaction zones at the same peak temperature. IP31, CP3 and IP32 are made at constant peak temperatures in the reaction zones, leading to shifting ethylene conversion levels. The same trends are observed versus IP11, CP1 and IP12; however with a broadening of all MWD's and higher conversion levels for all examples. CP31 and CP32 show the simulation results for the known distribution of make-up CTA. The known distribution of propylene leads to less differentiation in MWD and vinyl distributions, versus the inventive IP31 and IP32. These examples show that the inventive samples cover larger MWD and vinyl distribution ranges than the comparative samples, for instance the MWD range increases from 95-130% to 77-133%, while the V1"*MWD range for the polymer formed at the peak temperature increases from 0.63-0.98 to 0.47-1.00. The additional simulations with butene-1, as CTA, shows that the inventive distribution, as simulated in IP41, is very favorable to obtain a narrow molecular weight distribution. Furthermore the crosslinking stability of the polymer is improved by a lower priority and seniority of unsatuaration, and furthermore a larger part of the vinyls formed will be trans-vinyls. The reactor configuration, as described in Table 7, lacks the inventive capability to vary and control the distribution of the make-up ethylene along the reaction zones or ethylene based feed-streams, and therefore, at a given set of temperature and pressure conditions, the MWD and the distribution of unsaturations are fixed and cannot be varied or controlled. See Table 8.

Use of LDPE in Electrical Insulation Applications

Power cables used in electrical distribution and transmission applications are classified by the International Electrotechnical Commission as low-voltage (less than 1 kV), medium-voltage (1 kV up to 30 kV), high-voltage (above 30 kV up to 150 kV) and extra high-voltage (above 150 kV). WO 2016/204949 (PCT/US16/034000) describes preferred features of such cables, particularly the medium- to extra high-voltage cables, and the polymers and compositions used to fabricate the various polymeric layers.

Especially preferred for the compositions used to make the insulation sheaths of low-, medium-, high- and extra high-voltage cables is LDPE of low melt index at 190° C. and with 2.16 kg load (less than or equal to 5.0 dg/min, preferably less than or equal to 4.0 dg/min, more preferably less than or equal to 3.0 dg/min, most preferably less than or equal to 2.5 dg/min), low shear viscosity at 190° C. and 100 $s^{-1}$ shear rate (less than or equal to 1000 Pa s, preferably less than or equal to 900 Pa s, more preferably less than or equal to 800 Pa s, most preferably less than or equal to 700 Pa s), that also has broad molecular weight distribution (TDGPC–Mw (abs)/Mn (abs) (greater than or equal to 6, preferably greater than or equal to 7, more preferably greater than or equal to 8, most preferably greater than or equal to 9), high melt strength at 190° C. (greater than or equal to 3 cN, preferably greater than or equal to 4 cN, more preferably greater than or equal to 5 cN, most preferably greater than or equal to 6 cN), high terminal or total vinyl content (greater than or equal to 0.03 vinyl/1000 carbons, preferably greater than or equal to 0.05 vinyl/1000 carbons, more preferably greater than or equal to 0.10 vinyl/1000 carbons, most preferably greater than or equal to 0.15 vinyl/1000 carbons) and dissipation factor measured at temperatures up to 130° C. (60 Hz and 2 kV) of less than or equal to 3 percent, preferably less than or equal to 1.0 percent, more preferably less than or equal to 0.5 percent, most preferably less than or equal to 0.3 percent, in order to minimize electrical losses). A combination of high vinyl content and broad molecular weight distribution is especially desirable.

TABLE 4

Process conditions
Reactor configuration: 4 Rx zones: Lengths 136/153/646/340 m; Internal diameter 31/45/54/54 mm; Inlet pressure 2800 bar; Ethylene based feed distribution: 33.3/33.3/33.3/0; MI = 2 dg/min

| Example | Primary output distr Position | Make-up ethylene distr RZ2/RZ1 | Make-up ethylene distr RZ3/RZ1 | Make-up ethylene distr RZ2/RZ3 | CTA make-up distr Position | CTA type | Peak temps ° C. | Start and reinitiation temps ° C. | CTA feed distribution (make-up + recycle) over reaction zones wt % | MO content in Lube oil % |
|---|---|---|---|---|---|---|---|---|---|---|
| IP11 | side | ∞ | ∞ | 0.2 | front | C3= | 240/240/299/299 | 150/140/178/231 | 59/36/5 | ≥95 |
| CP1 | even | 1.0 | 1.0 | 1.0 | even | C3= | 240/240/302/302 | 150/142/179/234 | 33.3/33.3/33.3 | ≥95 |
| IP12 | front | 0.2 | 0 | ∞ | side | C3= | 240/240/308/308 | 150/146/179/237 | 6.7/33.3/60 | ≥95 |
| IP21 | side | ∞ | ∞ | 0.2 | front | C3= | 288/288/289/288 | 150/174/213/217 | 59/36/5 | ≥95 |
| CP2 | Even | 1.0 | 1.0 |  | even | C3= | 291/291/291/291 | 150/175/215/221 | 33.3/33.3/33.3 | ≥95 |
| IP22 | Front | 0.2 | 0 | ∞ | front | C3= | 293/293/293/293 | 150/176/216/222 | 25/34/41 | ≥95 |
| IP23 | Front | 0.2 | 0 | ∞ | side | C3= | 298/298/298/298 | 150/179/219/226 | 6.7/33.3/60 | ≥95 |
| IP31 | side | ∞ | ∞ | 0.2 | front | C3= | 298/298/298/298 | 150/174/216/224 | 66/28/6 | ≥95 |
| CP3 | Even | 1.0 | 1.0 | 1.0 | even | C3= | 298/298/298/298 | 150/176/217/225 | 33.3/33.3/33.3 | ≥95 |
| IP32 | Front | 0.23 | 0 | ∞ | front | C3= | 298/298/298/298 | 150/177/218/226 | 26.7/33.3/40 | ≥95 |
| CP31 | Even | 1.0 | 1.0 | 1.0 | front | C3= | 298/298/298/298 | 150/175/217/225 | 46.6/26.7/26.7 | ≥95 |
| CP32 | Even | 1.0 | 1.0 | 1.0 | side | C3= | 298/298/298/298 | 150/176/217/225 | 26.7/26.7/46.6 | ≥95 |
| IP41 | Side | ∞ | ∞ | 0.2 | front | C4= | 298/298/298/298 | 150/174/216/224 | 66/28/6 | ≥95 |
| CP4 | Even | 1.0 | 1.0 | 1.0 | even | C4= | 298/298/298/298 | 150/176/217/225 | 33.3/33.3/33.3 | ≥95 |
| CP41 | Even | 1.0 | 1.0 | 1.0 | front | C4= | 298/298/298/298 | 150/175/217/225 | 46.6/26.7/26.7 | ≥95 |
| IP42 | Front | 0.2 | 0 | ∞ | side | C4= | 298/298/298/298 | 150/179/219/226 | 6.7/33.3/60 | ≥95 |

Reaction zone 3 is the last (nth) reaction zone receiving an ethylene-based feed.
Reaction zone 1 is the first reaction.
Note
C4= is 1-butene, and C3= is propylene.
Note,
CP = comparative polymerization, and IP = inventive polymerization.
MO stands for mineral oil.

TABLE 5

Simulated results of the Final polymer, for examples described in Table 4

| Example | Starting Mw (DP) | LCB */1000C | SCB */1000C | MWD relative to CP2 % | Conversion % | Vinyl from β-scission sec. */1000C | Vinyl from CTA */1000C | Total vinyl V1 */1000C | Vinylidene from β-scission tert. V2 */1000C | V1/V2 |
|---|---|---|---|---|---|---|---|---|---|---|
| IP11 | 1120 | 3.11 | 28.1 | 50% | 32.0 | 0.103 | 0.412 | 0.515 | 0.259 | 1.99 |
| CP1 | 1600 | 3.205 | 27.8 | 78% | 32.0 | 0.105 | 0.403 | 0.508 | 0.266 | 1.91 |
| IP12 | 3000 | 3.39 | 27.7 | 186% | 32.0 | 0.109 | 0.388 | 0.497 | 0.278 | 1.79 |
| IP21 | 1210 | 3.17 | 28.1 | 65% | 32.0 | 0.107 | 0.389 | 0.496 | 0.271 | 1.83 |
| CP2 | 1600 | 3.27 | 28.1 | 100% | 32.0 | 0.109 | 0.383 | 0.492 | 0.277 | 1.78 |
| IP22 | 1860 | 3.325 | 26.9 | 125% | 32.0 | 0.111 | 0.378 | 0.489 | 0.282 | 1.73 |
| IP23 | 2840 | 3.49 | 28.2 | 243% | 32.0 | 0.115 | 0.365 | 0.48 | 0.294 | 1.63 |
| IP31 | 1220 | 3.67 | 28.4 | 77% | 33.8 | 0.115 | 0.364 | 0.479 | 0.295 | 1.62 |
| CP3 | 1660 | 3.62 | 28.3 | 117% | 33.2 | 0.115 | 0.362 | 0.477 | 0.296 | 1.61 |
| IP32 | 1910 | 3.6 | 27.2 | 133% | 33.0 | 0.115 | 0.362 | 0.477 | 0.296 | 1.61 |
| CP31 | 1415 | 3.65 | 28.3 | 95% | 33.4 | 0.115 | 0.362 | 0.477 | 0.296 | 1.61 |
| CP32 | 1800 | 3.59 | 28.3 | 130% | 32.9 | 0.115 | 0.362 | 0.477 | 0.295 | 1.62 |
| IP41 | 1025 | 3.64 | 23.9 | 63% | 33.7 | 0.114 | 0.352 | 0.466 | 0.291 | 1.60 |
| CP4 | 1410 | 3.58 | 23.9 | 95% | 33.2 | 0.114 | 0.353 | 0.467 | 0.292 | 1.60 |
| CP41 | 1190 | 3.61 | 23.9 | 77% | 33.3 | 0.114 | 0.352 | 0.466 | 0.292 | 1.60 |
| IP42 | 2607 | 3.44 | 23.9 | 138% | 32.0 | 0.113 | 0.358 | 0.471 | 0.289 | 1.63 |

Note:
V1 for CP4, CP41, IP41 and IP42 is the sum of vinyls and trans-vinyls due to the usage of butene-1 as CTA.

TABLE 6

Simulation results of the starting polymer and polymer at last peak temperature (T)

| | Starting polymer | | | Polymer at last Peak Temp | | | | V1" (polymer at last peak temp.) × MWD | V1" last Peak temp/V1 final polymer |
|---|---|---|---|---|---|---|---|---|---|
| | Total vinyl V1' | Vinylidene from β-scission tert. V2' | V1'/V2' | Total vinyl V1" | Vinylidene from β-scission tert. V2" | V1"/V2" | MWD relative to CP2* | | |
| Example | */1000C | */1000C | | */1000C | */1000C | | | */1000C | |
| IP11 | 0.423 | 0.091 | 4.65 | 0.738 | 0.699 | 1.06 | 50% | 0.37 | 1.43 |
| CP1 | 0.266 | 0.086 | 3.09 | 0.796 | 0.723 | 1.10 | 78% | 0.62 | 1.57 |
| IP12 | 0.08 | 0.079 | 1.01 | 0.842 | 0.761 | 1.11 | 186% | 1.57 | 1.69 |
| IP21 | 0.398 | 0.0945 | 4.21 | 0.631 | 0.638 | 0.99 | 65% | 0.41 | 1.27 |
| CP2 | 0.264 | 0.091 | 2.90 | 0.712 | 0.654 | 1.09 | 100% | 0.71 | 1.45 |
| IP22 | 0.2075 | 0.089 | 2.33 | 0.739 | 0.667 | 1.11 | 125% | 0.92 | 1.51 |
| IP23 | 0.077 | 0.084 | 0.92 | 0.799 | 0.698 | 1.14 | 243% | 1.95 | 1.66 |
| IP31 | 0.39 | 0.080 | 4.88 | 0.613 | 0.712 | 0.86 | 77% | 0.47 | 1.28 |
| CP3 | 0.243 | 0.078 | 3.12 | 0.700 | 0.712 | 0.98 | 117% | 0.82 | 1.47 |
| IP32 | 0.213 | 0.092 | 2.32 | 0.723 | 0.711 | 1.02 | 133% | 0.96 | 1.52 |
| CP31 | 0.32 | 0.097 | 3.30 | 0.668 | 0.713 | 0.94 | 95% | 0.63 | 1.4 |
| CP32 | 0.218 | 0.093 | 2.34 | 0.736 | 0.710 | 1.04 | 130% | 0.96 | 1.54 |
| IP41 | 0.437 | 0.094 | 4.65 | 0.598 | 0.689 | 0.87 | 63% | 0.38 | 1.28 |
| CP4 | 0.283 | 0.091 | 3.11 | 0.677 | 0.684 | 0.99 | 95% | 0.64 | 145 |
| CP41 | 0.358 | 0.093 | 3.85 | 0.646 | 0.687 | 0.94 | 77% | 0.49 | 1.39 |
| IP42 | 0.099 | 0.084 | 1.18 | 0.778 | 0.669 | 1.16 | 138% | 1.07 | 1.65 |

*Relative ratio of MWD's. The comparison is made against the MWD of CP2. The MWD of CP2 is set at 100%.

Note:
V1' and V" for CP4, CP41, IP41 and IP42 is the sum of vinyls and trans-vinyls due to the usage of butene-1 as CTA

TABLE 7

Process condition and simulation results of an "all-front-gas (ethylene feed (make-up + recycle)) tube reactor" which is 100/0/0/0
Reactor configuration: 4 Rx zones: Lengths 360/360/360/195 m; Internal diameter 54/54/54/54 mm; Inlet pressure 2800 bar; Ethylene based feed distribution: 100/0/0/0; MI = 2 dg/min

| | CTA type | Peak temps | Start and reinitiation temps | MO content in Lube oil | Starting Mw (DP) | LCB | SCB | MWD relative to CP2 | Conversion |
|---|---|---|---|---|---|---|---|---|---|
| Example | | °C. | °C. | % | | */1000C | */1000C | | % |
| CP5 | C3= | 286/286/286/286 | 150/245/242/255 | ≥95 | 1730 | 3.07 | 27.7 | 62% | 32 |
| CP6 | C4= | 286/286/286/286 | 150/245/242/255 | ≥95 | 1430 | 3.04 | 23.1 | 51% | 32 |

TABLE 8

Simulated Vinyl frequency of the whole polymer, starting polymer and polymer made at last peak temperature of examples described in Table 7

| | Whole polymer | | | | | Starting polymer | | | Polymer at last Peak T | | | | V1" (last peak T) × MWD |
|---|---|---|---|---|---|---|---|---|---|---|---|---|---|
| | Vinyl from β-scission sec. | Vinyl from CTA | Total vinyl V1 | Vinylidene from β-scission tert.V2 | V1/V2 | Total vinyl V1' | Vinylidene from β-scission tert. V2' | V1'/V2' | Total vinyl V1" | Vinylidene from β-scission tert. V2" | V1"/V2" | MWD relative to CP2 | |
| Ex. | */1000C | */1000C | */1000C | */1000C | | */1000C | */1000C | | */1000C | */1000C | | | */1000C |
| CP5 | 0.111 | 0.366 | 0.477 | 0.283 | 1.69 | 0.24 | 0.079 | 3.04 | 0.631 | 0.685 | 0.92 | 62% | 0.39 |
| CP6 | 0.109 | 0.364 | 0.473 | 0.279 | 1.70 | 0.284 | 0.076 | 3.74 | 0.672 | 0.603 | 1.11 | 51% | 0.34 |

Note:
V1, V1' and V" for CP6 is the sum of vinyls and trans-vinyls due to the usage of butene-1 as CTA

The invention claimed is:

1. A high pressure, free radical polymerization process to form an ethylene-based polymer, the process comprising at least the following step:

polymerizing a reaction mixture comprising ethylene, using a polymerization system comprising the following:

(A) a reactor configuration comprising at least one reactor that comprises at least two reaction zones, a first reaction zone (reaction zone 1) and an ith reaction zone (where i≥2); wherein the ith reaction zone is the last reaction zone, and wherein i is the total number of reaction zones;

(B) a hyper-compressor system disposed upstream of the at least one reactor;

(C) at least two ethylene-based feed streams, a first ethylene-based feed stream and an nth ethylene-based feed stream, wherein the first ethylene-based feed stream is sent to the first reaction zone, and the nth ethylene-based feed stream is the last ethylene based feed stream sent to the reactor configuration; wherein n≤i; and RZn/RZ1 does not equal 1.0, where RZ1=mole fraction of make-up ethylene in the first ethylene-based feed stream to the first reaction zone;

where RZn=mole fraction of make-up ethylene in the last ethylene-based feed stream sent to the reactor configuration;

(D) a control system located at the inlet section of the hyper-compressor system, wherein the control system controls the percentage of the make-up ethylene in the first ethylene-based feed stream, and the percentage of the make-up ethylene in the nth ethylene-based feed stream; and wherein at least one reaction zone receives a CTA make-up feed stream comprising an alpha-olefin, and wherein the alpha-olefin has a chain transfer activity constant (Cs) value ≤0.10, and wherein the chain transfer activity constant (Cs) is measured at 1360 atm, 130° C., and the first reaction zone receives a lower molar concentration of an "alpha-olefin CTA" in the ethylene-based feed stream to the first reaction zone, as compared to the molar concentration of the same "alpha-olefin CTA" in at least one ethylene-based feed stream to a subsequent reaction zone.

2. The process of claim 1, wherein the maximum temperatures in the first reaction zone, and, optionally, the second reaction zone are each ≤270° C.

3. An ethylene-based polymer formed by the process of claim 1.

4. The ethylene-based polymer of claim 3, wherein the ratio of the total vinyl (V1″) of the polymer made at the peak temperature in the last reaction zone, versus the total vinyl (V1) in the final polymer is equal to, or greater than, 1.55.

5. The ethylene-based polymer of claim 3, wherein the ethylene-based polymer has a total vinyl content (V1) from 0.460 to 0.520 per 1000 carbons (total carbons), and a V1/V2 ratio from 1.60 to 1.99, where V2 is the vinylidene content derived from the β-scission of a tertiary radical.

6. A composition comprising the ethylene-based polymer of claim 3.

7. An article comprising at least one component formed from the composition of claim 6.

8. The high pressure, free radical polymerization process of claim 1, wherein the control system further comprises an analyzer and the process further comprises measuring, with the analyzer, one or more of melt elasticity, melt strength, G', type and level of unsaturation, and molecular weight distribution (MWD), in at least one process stream of the polymerization.

9. The high pressure, free radical polymerization process of claim 1, wherein the control system further comprises at least one valve and the process further comprises adjusting, using the at least one valve, a flow ratio of make-up ethylene in the first ethylene-based feed stream and the percentage of the make-up ethylene in the nth ethylene-based feed stream to obtain one or more of the target MWD, melt strength, G', and type and level of unsaturation.

* * * * *